US006941279B1

(12) United States Patent
Sullivan

(10) Patent No.: US 6,941,279 B1
(45) Date of Patent: Sep. 6, 2005

(54) MUTUAL FUND CARD METHOD AND SYSTEM

(75) Inventor: Kevin Sullivan, Wilmington, DE (US)

(73) Assignee: Banke One Corporation, Chicago, IL (US)

( * ) Notice: Subject to any disclaimer, the term of this patent is extended or adjusted under 35 U.S.C. 154(b) by 0 days.

(21) Appl. No.: 09/511,362

(22) Filed: Feb. 23, 2000

(51) Int. Cl.[7] ............................................. G06F 17/60
(52) U.S. Cl. .......................... 705/35; 705/36; 705/37; 705/39
(58) Field of Search .................................. 705/35, 39

(56) References Cited

U.S. PATENT DOCUMENTS

| | | | |
|---|---|---|---|
| 3,634,669 A | 1/1972 | Soumas et al. | |
| 3,946,206 A | 3/1976 | Darjany | |
| 4,047,033 A | 9/1977 | Maimberg | |
| 4,545,838 A | 10/1985 | Minkus | |
| 4,594,663 A | 6/1986 | Nagata et al. | |
| 4,642,768 A | 2/1987 | Roberts | |
| 4,750,119 A * | 6/1988 | Cohen et al. | 705/14 |
| 4,831,242 A | 5/1989 | Englehardt | |
| 4,897,533 A | 1/1990 | Lyszczarz | |
| 4,978,401 A | 12/1990 | Bonomi | |
| 5,095,194 A | 3/1992 | Barbanell | |
| 5,117,355 A | 5/1992 | McCarthy | |
| 5,175,416 A | 12/1992 | Mansvelt | |
| 5,192,947 A | 3/1993 | Neustein | |
| 5,200,889 A * | 4/1993 | Mori | 705/14 |
| 5,202,826 A | 4/1993 | McCarthy | |
| 5,287,268 A * | 2/1994 | McCarthy | 705/14 |
| 5,326,960 A | 7/1994 | Tannenbaum | |
| 5,397,881 A | 3/1995 | Mannik | |
| 5,424,524 A | 6/1995 | Ruppert | |
| 5,450,477 A | 9/1995 | Amarant | |
| 5,465,206 A | 11/1995 | Hilt | |
| 5,471,669 A | 11/1995 | Lidman | |
| 5,477,038 A | 12/1995 | Levine | |
| 5,482,139 A | 1/1996 | Rivalto | |
| 5,500,514 A | 3/1996 | Veeneman | |
| 5,530,232 A | 6/1996 | Taylor | |
| 5,578,808 A | 11/1996 | Taylor | |
| 5,585,787 A | 12/1996 | Wallerstein | |
| 5,637,845 A | 6/1997 | Kolls | |
| 5,703,344 A | 12/1997 | Bezy | |
| 5,710,886 A | 1/1998 | Christensen | |
| 5,721,768 A | 2/1998 | Stimson | |
| 5,765,141 A | 6/1998 | Spector | |
| 5,777,305 A | 7/1998 | Smith | |

(Continued)

FOREIGN PATENT DOCUMENTS

JP             406149845 A    *    5/1994

OTHER PUBLICATIONS

CardEx Incentives, Apr. 6, 1999, cardexco.com.

(Continued)

*Primary Examiner*—Alain L. Bashore
(74) *Attorney, Agent, or Firm*—Hunton & Williams LLP

(57) ABSTRACT

A computerized method and system for implementing such method, the method comprising establishing a card payment instrument account for an approved customer and an investment account for the benefit of the approved customer. A rebate is calculated periodically based on credit card usage and the rebate is applied to fund the investment account periodically. The rebate is the only funding of the investment account accomplished through the card payment instrument account.

16 Claims, 4 Drawing Sheets

U.S. PATENT DOCUMENTS

| | | | |
|---|---|---|---|
| 5,787,404 | A | 7/1998 | Fernandez-Holmann |
| 5,857,079 | A | 1/1999 | Claus |
| 5,857,709 | A | 1/1999 | Chock |
| 5,864,830 | A | 1/1999 | Armetta |
| 5,870,718 | A | 2/1999 | Spector |
| 5,926,800 | A | 7/1999 | Baronowski |
| 5,955,961 | A | 9/1999 | Wallerstein |
| 5,970,480 | A | 10/1999 | Kalina |
| 5,991,750 | A | 11/1999 | Watson |
| 6,016,954 | A | 1/2000 | Abe |
| 6,036,099 | A | 3/2000 | Leighton |
| 6,038,552 | A | 3/2000 | Fleischl |
| 6,105,865 | A | 8/2000 | Hardesty |
| 6,164,533 | A | 12/2000 | Barton |
| 6,196,458 | B1 * | 3/2001 | Walker et al. ............... 235/380 |
| 6,243,688 | B1 | 6/2001 | Kalina |
| 6,345,261 | B1 | 2/2002 | Feidelson |
| 6,386,444 | B1 * | 5/2002 | Sullivan ...................... 235/379 |
| 6,549,912 | B1 * | 4/2003 | Chen ........................ 707/104.1 |

OTHER PUBLICATIONS

"Associates First Capital Corporation", Hoover's Inc., The Industry Standard: The Newsmagazine of the Internet Economy, thestandard.net/companies/cpmpany-display, Apr. 6, 1999.

Jeffrey M. Lacker, "Stored Value Cards: Costly Private Substitutions for Government Currency", Economic Quarterly, 1996.

"The Evolution of a New Consumerism", Chain Store Age, vol. 73, pp. 8-9, Jun. 1997.

Lisa Fickenscher, "Amex prepaid offering is latest card for firms regarding employees", American Banker, vol. 161, No. 151, p. 11, Aug. 8, 1996.

"Welcome to Swiftgift", www.swiftgiftcard.com, Dec. 8, 1998.

Lucy Lzarony, "Stuck for a gift? Give a prepaid credit card", www.bankrate.com, Dec. 21, 1998.

Antoinette Coulton, "Incentives field moving to card-based series 14", American Banker, Mar. 26, 1998.

Credit Card News, "A store card issuer looks for lift from electronic gift certificates", Feb. 1, 1995.

Business Travel News, "Maritz gets mastercard's stamp of approval", Aug. 19, 1996.

Debit Card News, vol. 2, Issue 2, "Boatman's floats stored value into the employee incentive waters", Jul. 16, 1996.

Mickey Meece, "Boatman's prepaid cards for worker-incentive firm", American Banker, Jul. 2, 1996.

Card News, vol. 6, No. 25, "D.C. Area Safeway stores look for increase in sales volume and revenue with cards", Dec. 1991.

Spurgin, "Sopininmon! or What's happening in the retail credit card environment", Credit World Journal, Apr. 1997.

AT&T Marketing, "Universal card free lifetime membership extended 3 months", att.com, Dec. 4, 1990.

Chain Store Age Executive with Shopping Center Age, "More retailers turn to co-branding", Feb. 1, 1995.

Introducing SpendingMoney(TM), Armetta: Marketing & Design Product Concept Report, Oct. 9, 1996.

First USA Platinum Connect, First USA Bank, First USA Promotional Mailing, Oct. 1997.

Introducing the First USA Platinum Connect Card, First USA Promotional Mailing, Dec. 1997.

Here's the calling convenience you asked for: 1-800-call-AT&T . . . For All Calls, Appendix A: For Card Carriers.

Beth Piskora, Debit Cards Seen Poised for New Markets, American Banker, pp. 16, Mar. 7, 1995.

Nick Rosen, Cash Just Isn't Flexible Enough: Shops of the Future Will Only Take Cards, Daily Express: Technology Section, Feb. 10, 1995.

Phil Britt, Competing in Auto Lending, America's Community Banker, vol. 5, No. 11, pp. 33-37, Nov. 1, 1996.

Miriam Krenin Souccar, Smart Cards: 1st Union Smart Card Pilot Enlists a Second Army Base, American Banker.

First Union Issues Smart Cards to Fort Benning Recruits, CardFax.

Emerson Brown and Jim Baum, Purchasing Card Magic: Eli Lilly Finds Accounts Payable Flying High With Plastic, Corporate Cashflow.

International Search Report for Application No. PCT/US01/03587 filed on Feb. 9, 2000 and dated Apr. 27, 2001.

International Preliminary Examination Report for Application No. PCT/US01/03587 filed on Feb. 9, 2000 and date Jul. 18, 2002.

Christine Dugas, Payroll May Ask: Paper or Plastic?, USA Today, 3B, Aug. 14, 2001.

International Search Report for Application No. PCT/US01/05458, Filed Feb. 22, 2001.

* cited by examiner

CREDIT STATEMENT BILL FOR ACCOUNT 12345678 — 300

| DATE | TRANSACTION CODE | VENDER ID | AMOUNT |
|---|---|---|---|
| X | XXX | A | $XX.XX |
| . | . | . | . |
| . | . | . | . |
| . | . | . | . |
| X | XXX | X | $XX.XX |
| PREVIOUS BALANCE $XXXX.XX | NEW CHANGES $XXX.XX | PAYMENTS $XXX.XX | NEW BALANCE $XXXX.XX |

| CREDIT USAGE FOR MONTH $XXXX.XX | USAGE REBATE FOR MONTH $XX.XX | CURRENT REBATE VALUE $YYY.YYY MUTUAL FUND ACCOUNT | REBATE PAYOUT DATE X/X/XX | MUTUAL FUND ACCOUNT XXX XXX |
|---|---|---|---|---|

FIG. 3

MUTUAL FUND ACCOUNT STATEMENT XXX XXX — 400

| FUND NUMBER | NUMBER OF SHARES | PRESENT VALUE | CREDITS* | FUTURE CREDITS | FUTURE CREDITS PAYOUT DATE |
|---|---|---|---|---|---|
| XXX XXX | $XXX.XX | $XXX.XX | $YYY.YY | $YYY.YY | X/X/XX |

*CREDITS
$YYY.YY TRANSFERRED FROM CARD ISSUER X AS USAGE REBATE
FOR ACCOUNT 12345678 AS OF X/X/XX

FIG. 4

MUTUAL FUND CARD METHOD AND SYSTEM

FIELD OF THE INVENTION

The present invention relates generally to a method and system for a card payment instrument that is associated with an investment account. A holder of the card payment instrument can receive rebates based on the usage of the card. The rebates are transferred periodically to an investment account that is established for the benefit of the cardholder.

BACKGROUND OF THE INVENTION

It is increasingly common that consumers pay for many of their products and services using credit cards, charge cards, debit cards, bankcards, stored value cards and like card payment instruments rather than using cash or checks. Consumers do this because they find it more convenient than sending or using cash or checks. Also, consumers are not constrained by cash at hand. For instance, credit cards present unique advantages insofar as they provide a revolving line of credit that can be accessed when personal funds are low. Consumers are inclined to use credit cards versus other means for purchases because itemized reports of transactions (citing amounts and merchant names) are generated each month. This is useful for monitoring spending habits, detecting fraud or errors, disputing charges, proving purchase when returning items without a conventional receipt, and providing expense records for end-of-year tax purposes.

In fact, in today's so-called "plastic economy" it is increasingly common that consumers use the credit card as a first, rather than last, resort. Many consumers use credit cards for most non-trivial transactions, taking advantage of the typical 20–25 day interest-free grace period and paying their balances off each month, sometimes thousands of dollars. At the other end of the spectrum, many consumers who have expenses that exceed their monthly income on a regular basis use the available revolving credit-line to manage their spending flow. In sum, there is a large body of credit or other cardholders in modern society who engage in a significant volume of transactions on a regular, continuous basis.

The modern plastic economy greatly benefits merchants and service providers because the convenience and instant credit access lead to increased sales. They also benefit the issuer of the credit cards and other card payment instruments such as an issuing bank because for each transaction an "interchange" fee (typically 1–4%) administered by the credit card associations such as Visa® and MasterCard® is distributed to the issuer. The interchange fee is typically deducted from the overall transaction amount. Moreover, the issuer of the credit card benefits from the elevated interest payments made by consumers carrying a balance. Therefore, in the card issuer/merchant/customer model of a card payment instrument system such as a credit card system, the card issuers and merchants receive substantial benefits.

Thus, consumers tend to use their conventional credit cards for certain types of purchases, such as retail transactions in shopping malls, groceries at foodstores, dinner at restaurants, airline tickets and so forth. The credit card's attributes make it well-suited for use in such transactions and the average consumer is likely to reach for his/her credit card rather than for cash in such circumstances due to convenience. However, despite the wide use of credit cards in the modern economy, there is still a need to increase their use especially in non-traditional credit card transactions and financial services.

Some card issuers have sought to employ rebates in order to increase use of credit cards. Credit card rebate systems, such as the Discover® card or the like, provide a rebate tied to general card usage. The entire benefit is enjoyed by consumers who receive a check or credit on their account. However, such credit card rebate systems provide no particular long-term benefits to the cardholder or the card issuer—especially benefits that relate to the card issuer's business. There is limited loyalty-building to encourage cardholders to maintain their existing accounts or open new ones. Moreover, because the rebate is sent directly to the consumer, who can spend it as he/she pleases, there is no mechanism to encourage the consumer to consider other financial products offered by the card issuer or associated financial companies. Nor is there a way to channel funds back to the card issuer to expand business and cross-sell. This is a lost opportunity and significant disadvantage.

Others have suggested credit card systems that transfer a predetermined amount of money to an investment account periodically and bill the cardholder through the credit card account. For example, U.S. Pat. No. 5,787,404 to Fernandez-Holmann describes such a credit card system in combination with a rebate that is also transferred to the investment account. Such credit card systems, however, are not favored by cardholders because they require forced investments on a periodic basis. In addition, many brokerages and securities firms do not offer card acceptance for investment purchases.

SUMMARY OF THE INVENTION

The present invention overcomes one or more of the aforementioned limitations of existing card payment systems and methods. Accordingly, the present invention is directed to a system and method for a card payment instrument with a rebate based on the usage of the card payment instrument. The rebate can only be applied for funding an investment account established for the benefit of the cardholder. Thus, the present invention encourages increased usage of the card payment instrument and the establishment of new investment accounts.

It is an object of the invention to provide a card payment instrument whereby a predetermined percentage of consumer card payment instrument spending is rebated so as to encourage customer use of the card payment instrument and increase loyalty to the card payment instrument issuer.

It is another object of the invention to provide an automatic method for establishing an investment account which relieves the consumer of the burden of having to proactively establish an investment account, and promotes new account openings for the investment account provider.

It is yet another object of the invention to provide a card payment instrument where the card payment instrument issuer and the investment account provider can share the cost of the rebate program so that a significant rebate can be provided without imposing excessive costs on the card payment instrument issuer.

To achieve these and other objects, which will become readily apparent to a person skilled in this art from the following discussion, the present invention, in its broadest aspects, is directed to a computerized method and system for implementing such method, the method comprising establishing a card payment instrument account for an approved customer and an investment account for the benefit of the approved customer. A rebate is calculated periodically based on credit card usage and the rebate is applied to fund the investment account periodically. The rebate is the only funding of the investment account accomplished through the card payment instrument account. Preferably, the card payment instrument is issued by the card payment instrument issuer in partnership with the investment account provider. The investment account provider is preferably a financial institution such as a bank, savings and loan association, mutual fund, insurance company, brokerage, credit union or any other entity authorized by law to accept deposits from, or sell investments, mutual funds or annuities to, the general public.

In one embodiment of the present invention the card payment instrument is a credit card and the investment account is a mutual fund account provided by an investment account provider. Preferably, the consumer signs up for the card knowing about the ability to earn dollars that fund a mutual fund. The rebate is preferably calculated as a percentage of the value of the net-purchases by the customer using the credit card. The rebate is calculated periodically, such as on a monthly or quarterly basis and a statement is issued to the cardholder which includes an entry for an estimated rebate for the current period as well as the total accumulated rebate. The statement may further include an offer to the cardholder to activate and fund an investment account which is established automatically for his/her benefit by the investment account provider if this option wasn't taken by the consumer at the outset. Upon acceptance of the offer by the cardholder, the mutual fund account is automatically activated and funded with the accumulated purchase rebates. The mutual fund account is funded with the purchase rebates on a monthly basis, preferably once or twice a year, more preferably on a semi-annual basis and even more preferably on a yearly basis. The rebate amount is preferably transferred to the investment account electronically, however, other ways of transferring could be used including, for instance, submitting the rebate as a two-party check which can be submitted by the consumer to the investment account provider. An investment account statement is issued to the customer preferably by the investment account provider on a periodic basis. The investment account provider is preferably an independent entity from the card payment instrument issuer and the cost or funding of the rebate program is shared by both entities. The customer may independently fund the investment account at any time.

This method and system which is also referred to hereinafter as the mutual fund card ("MFC") is advantageous in a number of respects. First it encourages the creation of new investment accounts and maintenance of existing credit card accounts. Second, it provides investment account companies such as brokerage companies an entry into the credit card economy. It is beneficial to associated investment account providers such as mutual fund issuers who seek expanded opportunities to create a loyalty and retention platform for new or existing customers. Moreover, the funding of the investment account with the purchase rebates serves as a powerful incentive to customers to stay loyal to the credit card issuer, increase the usage of their credit cards and open new investment accounts or maintain existing ones with associated financial institutions. Thus, the MFC system and method opens the door for unique partnership relationships between independent business entities, not otherwise readily established between financial institutions such as for example banks and brokerage companies.

The accompanying drawings further illustrate the present invention. They illustrate several specific embodiments of the invention and, together with the description, serve to explain the principles of the invention. However, it will become apparent from the drawings and description that other embodiments, objects, advantages and benefits of the invention also exist. Thus, it should be understood that the drawings and the specific embodiments are given for purposes of illustrating the invention and are not intended to limit the scope of the invention which is delineated in the appended claims.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 3 is a block diagram according to an embodiment of the invention illustrating an exemplary credit card bill issued to a cardholder, including summaries of the rebate balance.

FIG. 4 is a block diagram according to an embodiment of the invention illustrating an exemplary mutual fund account statement, including a summary of credits rebated by a card issuer system.

DETAILED DESCRIPTION OF THE INVENTION

The present invention is directed to a method and apparatus for a card payment instrument with a rebate that is associated with an investment account, whereby rebates based on card usage are transferred to the investment account periodically for funding the investment account. The term "card payment instrument" is used herein to mean credit cards, multi-featured credit cards, debit cards, bank cards, stored value cards, transaction cards and like instruments. According to one embodiment of the invention a credit card is issued by a credit card issuer such as a bank in partnership with an investment account provider such as a brokerage company. Preferably, the brokerage company offers shares in a mutual fund investment program. A credit issuer such as a bank issues approved customers a credit card having a line of credit and a predetermined annual percentage rate (APR). The card is preferably marked with information of the identity of the issuing bank as well as the investment account provider. When the card is issued, the bank notifies the partner investment account provider to open a mutual fund account for the benefit of the cardholder. Net purchases made with the credit card are tracked and at the end of predetermined periods, a fixed, predetermined percentage, preferably from about 0.5 to about 2.0 and more preferably from about 0.75 to about 1.25 percent of the total value of the net purchases is rebated by the bank into the mutual fund account. During special marketing promotional periods, the rebate amount can be increased. The cost of the rebate program is preferably absorbed by both the credit card issuer and the investment account provider which allows for greater rebates to the consumer. In the normal course of business, the partner investment account provider may issue the customer a mutual fund or investment account statement. Alternatively, a combined credit card account and mutual fund account statement may be issued, preferably by the credit card issuer. In addition, the customer may purchase additional mutual fund shares at any time.

Overview of the Invention According to One Embodiment

Figure 1:
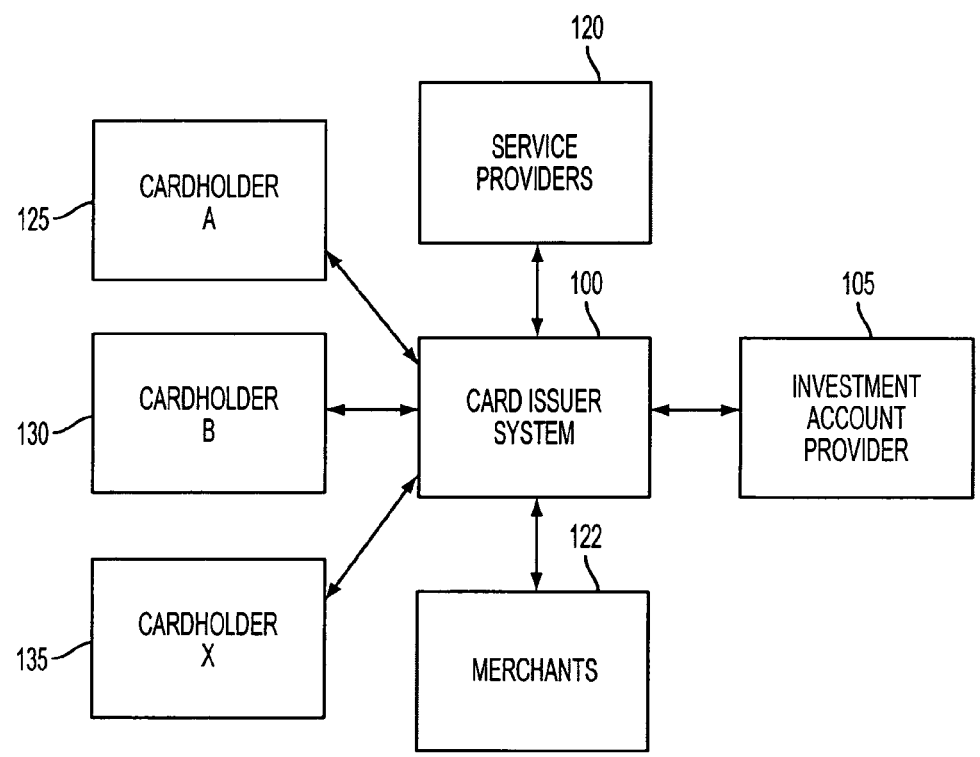
FIG. 1 is a block diagram illustrating the relationship between cardholders, service providers, merchants, the card issuer system and investment account provider, according to an embodiment of the present invention.

FIG. 1 provides an overview of the relationships between the various components according to one embodiment of the present invention, and may comprise cardholder A 125, cardholder B 130, cardholder X 135; card issuer system 100; service providers 120 and merchants 122; and investment account provider 105. Card issuer system 100 may comprise a server-based system carrying out the operations of the card issuer, such as for receiving applications, maintaining account data, processing transactions, and interfacing with cardholders, merchants, service providers and investment account providers.

Service providers 120 and merchants 122 illustrate the various vendors that interact with cardholders A–X (blocks 125–135) and card issuer 100 during transactions involving the purchase of goods and services.

Investment account provider 105 represents an investment account provider participating as the partner in the mutual fund card program associated with the present invention. Investment account provider 105 may comprise personnel and/or computer means for receiving and processing usage rebate funds or "points" submitted by card issuer system 100 or from individual cardholders, such as cardholders A–X (blocks 125–135). In one embodiment, the invention provides for investment account provider 105 to receive and process checks or wire transfers from card issuer system 100 so that the card usage rebate for a given time period is sent from the card issuer to the investment account provider to be credited against the benefiting investment account. Preferably the investment account is a mutual fund account. In a related embodiment, the invention provides for investment account provider 105 to process electronic transfers (such as automated clearing house drafts) from card issuer system 100 for each approved cardholder that are processed in an automated or semi-automated fashion to credit the proper investment account with the proper card usage rebates. In another embodiment, the invention provides for investment account provider 105 to receive and process two-party checks, initially issued to cardholders from card issuer system 100, that are forwarded by the cardholders to the investment account provider for depositing into the respective cardholder investment accounts. These checks would be made so that cardholders could only deposit them to their investment accounts, thus providing an incentive to the cardholders to activate and/or maintain the investment accounts.

In the preferred embodiment, investment account provider 105 represents an investment account provider that is partnered with the card issuer issuing a so-called "co-branded" credit instrument. For such co-branded credit or debit cards, the physical card may be issued in the investment account provider's name (and also in the card issuer's name) to take advantage of the benefits of cross-selling and to facilitate loyalty-building. In another embodiment, the credit card with the rebate feature is not marketed as a co-branded offering per se, but cardholders are offered the option to add the investment account feature at any time.

Cardholder A 125, cardholder B 130 and cardholder X 135 represent cardholders maintaining card accounts according to the present invention. In other words, these cardholders maintain a credit or debit card account with the card issuer whereby a predetermined percentage of card usage is accumulated and returned as a rebate to be applied for funding an investment account set-up by the brokerage provider for the benefit of each cardholder. In a preferred embodiment the investment accounts are provided by an investment account provider that is associated with the card-issuer.

In an alternate embodiment, cardholders can maintain investment accounts with investment account providers that are not formally partnered with the card issuer, as described previously. In this case, the card issuer has not entered into a formal arrangement with the investment account provider, but rather is marketing the card to consumers on the basis that purchase rebates will be transferred to an investment account designated by the cardholder. This rebate may also take the form of a two-party check sent to the cardholder for depositing it into the investment account. Or the rebate could be sent directly to the investment account provider (by check, wire transfer, electronic payment, and the like). One of the benefits of this alternate embodiment is that it encourages non-partnered investment account providers to consider a formal partnering relationship (e.g., a co-branded card). This is because an initially non-partnered investment account provider gradually becomes aware of the profit and marketing potential that exist from co-branding and participating in the program. This benefits both the card issuer and investment account provider because processing can be streamlined (e.g., rebates can be transferred electronically and automatically, even in batch fashion, rather than through wire transfers or checks) and cross-marketing and joint loyalty benefits accrue. For example, the card issuer and investment account provider can cross-market whereby customers of the one are solicited to purchase the products or engage the services of the other. A co-branded debit card could serve as a consumer access vehicle to an investment account provider deposit account such as a money market fund. This is a substantial advantage.

Cardholders A–X (blocks 125–135) interface with card issuer system 100 for purposes of payment and receipt of bills and the like using the mail system, Internet or like shared network. Cardholders A–X (blocks 125–135) interface with merchants 122 and service providers 120 to consummate purchases and the like in-person or using the mail system or Internet or like shared network. Cardholders A–X (blocks 125–135) interface with investment account providers 105 for purposes of opening accounts, submission of payments, receipt of bills and the like using the mail system, Internet or like shared network.

As noted above, the present invention may provide a percentage rebate based on card usage that can be paid by the card issuer. In one embodiment, that amount may be fixed at 1% of the value of net-purchases calculated periodically and vested after a standard period, such as a quarter or year. In this embodiment, the balance of the usage rebate will be updated and reported to the cardholder on a periodic basis, such as at the time each monthly card statement is issued. The usage rebate rate can vary, for example, based on the investment account provider's concern (higher or lower rebate rates depending on the investment account provider and the agreement with the card issuer) and based on the cardmember (higher or lower rebate rates based on the cardmember's past or ongoing purchasing behavior, credit rating, levels of spending [e.g., a higher rebate rate at higher levels of spending], loyalty in terms of how long the cardmember has been associated with the card issuer and/or the investment account provider, payment performance, etc.). In one embodiment, the funding for the usage rebate may be shared between the card issuer and an investment account provider as both benefit from the arrangement. In yet another embodiment, the rebate percentage is fixed at a predetermined level provided by the credit card issuer.

Regarding the accrual or computation period, the usage rebate may be computed on a periodic basis, such as on a monthly basis. Since credit card issuers generally deliver paper or on-line statements to cardholders on a monthly basis, it may be convenient and cost-effective to accrue and report the usage rebate in similar fashion. Timing for payout, i.e., when the rebate funds are transferred to the investment account provider for depositing into the investment account, can vary as well. In one embodiment, the payout period may be annually or semi-annually so as to reduce processing costs for the cardholder and investment account provider. It can also enhance cardmember loyalty to both the card issuer and investment account provider if the payout is predicated on the cardmember still being an active account holder. For example, a cardmember contemplating canceling the credit account and/or the investment account program in July may be less inclined to do so if he/she knows that the accumulated rebate that will mature or vest later in September would be lost.

The present invention is not limited to a specific type of investment account. A variety of different types of investment could be used such as "e brokerage" accounts, money market funds, general stock investment accounts and employee stock purchase accounts. As can be readily appreciated, this means that the present invention provides significant opportunities for financial institutions such as investment account providers to market cardmembers on a broad spectrum of investment products that are available.

The Card Issuer System

Figure 2:
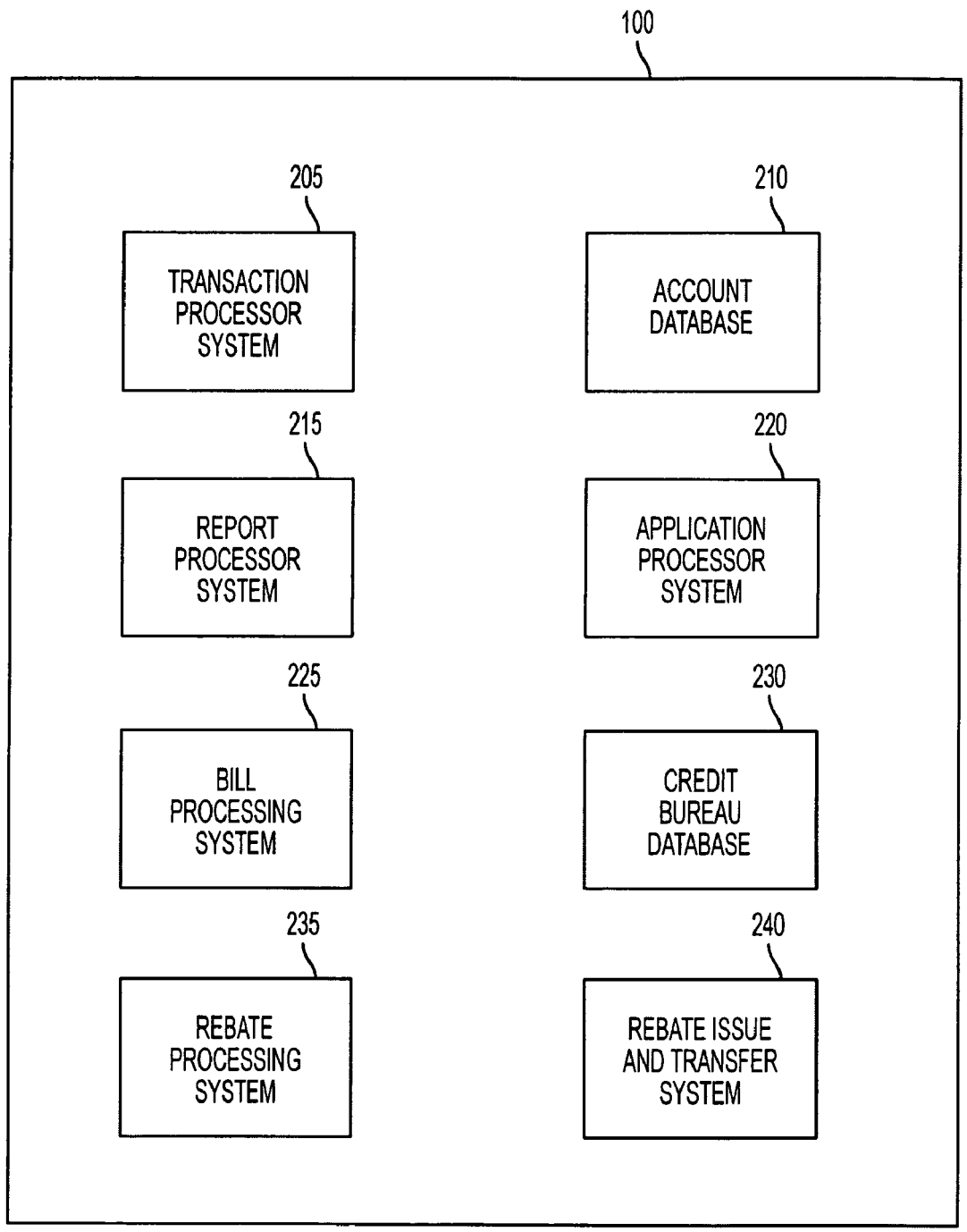
FIG. 2 is a block diagram according to an embodiment of the invention illustrating the components of a card issuer system.

FIG. 2 illustrates card issuer system 100, which may comprise transaction processor system 205; account database 210; report processor system 215; application processor system 220; bill processing system 225; credit bureau database 230; rebate processing system 235; and rebate issue and transfer system 240. Those of skill in the art should appreciate that the allocation of the aforementioned elements is exemplary and functional, the purpose here being to explain the present invention most clearly. The functions performed by said elements could be allocated differently, such that the elements could be combined or further divided depending on the requirements of specific implementation into hardware and/or software. Additionally, the elements of the system need not be co-located, but could reside at geographically distinct locations and could interface using communications technologies well known in the art, such as direct-dial connections, hard-wire link, the Internet or IPng (Internet Protocol next generation), satellite, microwave, cellular networks and so on.

Transaction processor system 205 is a computerized system, which may be a server-based system, for processing transactions in the credit card-based system, such as consummating purchases (issuing transaction codes, declines, call the bank ["call me"] referrals, etc.), processing payments from cardholders, and processing transactions with investment account providers. Account database 210 may comprise one or more data modules having account data for the cardholders, including investment account data and investment account provider data. Report processor system 215 generates reports or statements for the card issuer and/or investment account provider company summarizing cardholder activity, profits and revenue and the like. Application processor system 220 receives and processes applications for credit cards, and may set up accounts when applications are approved. In one embodiment, application processor 220 could also receive applications for investment accounts, and process said requests or forward them to the investment account provider for processing. Bill processing system 225 prepares the bills to be sent to cardholders, including a summary of charges, balance due, accrued rebate balance, due date and the like. The bills may optionally include investment account information. Credit bureau database 230 may comprise a database accessed for application processing for making the underwriting determination associated with credit card approval and/or investment account approval. Since the present invention is susceptible to application to debit cards, the aforementioned elements could perform the corresponding operations for a debit card instrument.

Rebate processing system 235 performs the processing associated with accounts established for cardholders under the present invention and, accordingly, computes card usage over the proper period, computes the usage rebate, and maintains the usage rebate balance for participating cardholders. Rebate issue and transfer system 240 performs the processing and transactions for issuing and transferring the usage rebates in the appropriate amounts and at the proper times. Thus, rebate issue and transfer system 240 may determine that a six-month rebate for a certain investment account will vest for a particular cardholder on December 15 and transfer said rebate via check, wire transfer, or electronic transfer to the investment account. Data stored in account database 210 may be accessed to inform rebate issue and transfer system 240 whether the form of the transfer should be check, wire or electronic for a particular investment account or investment account company. Rebate issue and transfer system 240 may determine that the usage rebate should be issued to the cardholder in the form of a two-party check. As explained above, the rebate is preferably based on the net purchases in a credit card account.

Exemplary Credit Card and Investment Account Statements for the Invention

FIG. 3 illustrates an exemplary statement (bill) issued to a cardholder according to the invention. As those of skill in the art will appreciate, the bill could be issued through the mail or via facsimile or Internet or like network interface. As depicted by FIG. 3, the credit card statement resembles a typical credit card statement, identifying the date, transaction codes, vendor/merchant ID's and amounts for the transactions from the last period. The previous balance, new charges, payments and new balance are also reported. For purposes of reporting the status of the usage rebate, the card usage for the period (here for the month it is "$XXXX.XX") is reported, as well as the usage rebate for the period as computed based on the rebate rate (e.g., 1% of $XXXX.XX yields a usage rebate for the month in the amount of $XX.XX). The current rebate value or balance is reported (here it is "$YYY.YY"), reflecting the accrued value of the usage rebate that has yet to vest or be paid out. The rebate payout date reflecting when the usage rebate will vest or be made available is reported (here it is "X/X/XX"), as is the identity of the beneficiary account (investment account provider account) to which the rebate may be applied.

FIG. 4 illustrates an exemplary investment account provider statement that might be generated by the investment account provider according to the present invention. As would typically be the case, the investment account number, number of shares, and date are listed. Credits received from a card issuer in the form of usage rebates (here it is "$YYY.YY") according to the present invention may be listed as credits, with an explanation identifying the amount and source of the credits (usage rebates). Rebates that have not been transferred to the investment account as of the date of the statement may also be included in the statement as future credits.

It should be noted that the investment account provider statement illustrated by FIG. 4 is more illustrative of the card usage rebate application where rebate funds are sent or transferred from the card issuer to the investment account provider. In the embodiment providing for rebate funds to be sent to the cardholder in the form of a two-party check or the like, the cardholder will forward the rebate check to the investment account provider.

A Method for Providing Card Usage Rebates for Funding a Mutual Fund Account

Figure 5:
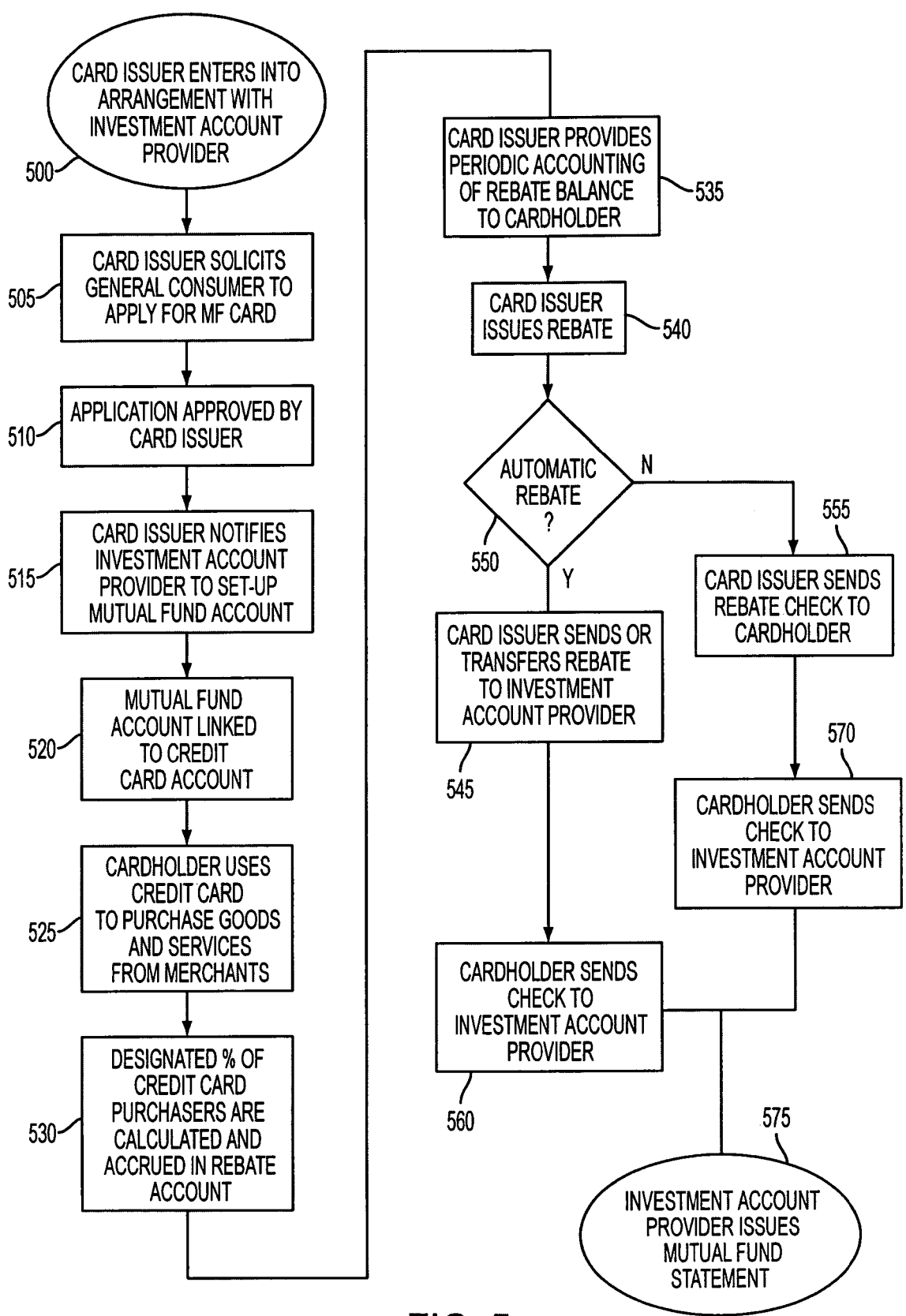
FIG. 5 is a flowchart illustrating a method according to an embodiment of the invention for providing rebates to a cardholder's mutual fund account based on card usage.

According to an embodiment of the present invention, FIG. 5 depicts a method for a credit card system providing card usage rebates to a cardholder for application to a mutual fund account set-up by an investment account provider for the benefit of the cardholder. Where the instrument is a debit card, the steps are substantially the same except the usage is based on a debit instrument.

A card issuer enters into an arrangement with an investment account provider (e.g., see account database 210), according to step 500. As previously noted, this arrangement may be in the form of a partnering or co-branding undertaking whereby the credit or debit cards are issued under the credit issuer's name and the two entities, the credit card issuer and the investment account provider, have pre-established procedures for handling the processing associated with the accrual and application of rebates to a mutual fund account. Alternatively, the investment account provider and card issuer may not have a partnering relationship, or have any pre-existing relationship at all, but step 500 includes the interface and communication between the two entities for the usage rebate program to be implemented for a given cardholder.

According to step 505, the card issuer (or its agent) solicits a general consumer to apply for a mutual fund card. The application is processed and approved by the card issuer (e.g., see application processor system 220, credit bureau database 230), according to step 510. The card issuer notifies the investment account provider to set-up a mutual fund account for the approved cardholder according to step 515. The mutual fund account card is linked or associated with the credit card (or debit) account (e.g., see account database 210), according to step 520. The cardholder uses the credit (or debit) card to purchase goods and services from merchants (or service providers) (e.g., see transaction processor system 205), according to step 525. A designated percentage of credit card purchases is calculated and accrues in the usage rebate account (e.g., see rebate processing system 235 and account database 210), according to step 530.

The card issuer provides a periodic accounting of the usage rebate balance to the cardholder (e.g., see bill processing system 225), according to step 535. The card issuer issues a rebate (see, e.g., module 240, FIG. 2) when the usage rebate "vests" or is due to be paid out, according to step 540. If the rebate is to be a so-called "automatic" payout (sent from the card issuer to the investment account concern), according to the "Y" (yes) branch of block 545, then the card issuer sends or transfers the rebate to the investment account concern to be credited to the proper investment account provider account (e.g., see module 240, FIG. 2), according to step 550. If the rebate is not a so-called "automatic" rebate, according to the "N" (no) branch of block 545, the card issuer sends a check (two-party check or bank draft, or wire or electronic transfer, or the equivalent) to the cardholder (e.g., see module 240, FIG. 2), according to step 555.

According to step 570, the cardholder sends the check or like instrument to the investment account provider. According to step 575, the investment account provider issues a mutual fund statement to the cardholder. The cardholder can make independent deposits to the mutual fund account, according to step 560.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A computerized method comprising:
    a credit card account provider establishing a credit card account using a computer for an approved cardholder;
    monitoring the net-purchases in said credit card account and calculating a rebate based on a percentage of said net-purchases periodically using a computer;
    issuing a statement to said cardholder using a computer including said calculated rebate and an offer to activate and fund an investment fund account with said rebate;
    activating said investment fund account upon acceptance of the offer by the cardholder;
    transferring the rebate to the investment fund account using a computer; and
    issuing a statement including information of the value of the investment fund account to said cardholders;
    wherein the statement including information of the value of the investment account is an investment account statement identifying rebate value applied to the investment account; and
    wherein the investment account statement further identifies an accrued rebate value which has not yet vested to be applied to the investment account.

2. The computerized method of claim 1, wherein the investment fund account is a new investment fund account established as a result of the credit card account provider requesting the investment account provider to set-up the new investment fund account for the benefit of said approved cardholder.

3. The computerized method of claim 1, wherein the investment fund account is an existing investment fund account, and wherein acceptance of the offer by the cardholder further comprises designating the existing investment fund account, and wherein activating the investment fund account comprises linking the investment fund account to the credit card account.

4. The computerized method of claim 1, wherein following activation of the investment account, the rebate accrues according to a first period, and wherein the rebate can vest to be applied to the investment account according to a second period, wherein the second period is longer than the first period.

5. The computerized method of claim 4, wherein the first period is monthly and wherein the second period is semi-annually or annually.

6. The computerized method of claim 1, further comprising issuing a credit card statement providing a computed rebate for the most recent period, an accrued rebate value, and a vesting date.

7. The computerized method of claim 1, wherein the funding for the rebate is shared between the credit card account provider providing the credit card account and the investment account provider providing the investment fund account.

8. The computerized method of claim 1, wherein the percentage is a variable percentage based on cardholder loyalty.

9. A computerized method comprising:
establishing a card instrument account for an approved cardholder by a card instrument issuer using a computer;
calculating a rebate periodically using a computer based on card usage for the card instrument account;
issuing a statement using a computer including said calculated rebate and an offer to apply the rebate to an investment account not presently linked to the card instrument account;
activating said investment fund account upon acceptance of the offer by the cardholder;
applying said rebate to the investment account using a computer upon acceptance of the offer;
issuing a statement including information of the value of the investment fund account to said cardholder;
wherein the statement including information of the value of the investment account is an investment account statement identifying rebate value applied to the investment account; and
wherein the investment account statement further identifies an accrued rebate value which has not yet vested to be applied to the investment account.

10. The computerized method of claim 9, wherein the investment account is a new investment account automatically established upon acceptance of the offer, the new investment account being linked to the card instrument account.

11. The computerized method of claim 9, wherein the investment account is an existing investment account, the cardholder designating the existing investment account to be linked with the card instrument account.

12. The computerized method of claim 9, wherein upon activation of the investment account, the rebate accrues according to a first period, and wherein the rebate can vest to be applied to the investment account according to a second period, wherein the second period is longer than the first period.

13. The computerized method of claim 12, wherein the first period is monthly and wherein the second period is semi-annually or annually.

14. The computerized method of claim 9, further comprising issuing a card instrument statement providing a computed rebate for the most recent period, an accrued rebate value, and a vesting date.

15. The computerized method of claim 9, wherein the funding for the rebate is shared between the card issuer providing the card account and the investment account provider providing the investment account.

16. The computerized method of claim 9, wherein the rebate is based on a variable percentage based on cardholder loyalty.

\* \* \* \* \*